United States Patent [19]
Pilsner et al.

[11] 4,006,852
[45] Feb. 8, 1977

[54] GAS TANK CARRIER FOR CAMPER OR TRAILER

[76] Inventors: Victor F. Pilsner, Rte. 1; Merrlin M. Helmer, 219 Main St., both of Horicon, Wis. 53032

[22] Filed: Apr. 14, 1975

[21] Appl. No.: 567,903

[52] U.S. Cl. .................... 224/42.03; 224/42.21; 224/42.45 R; 280/5 R; 296/23 R
[51] Int. Cl.² ...................................... B60R 11/00
[58] Field of Search ............ 224/42.03 R, 42.03 A, 224/42.03 B, 42.07, 42.08, 42.45 R, 42.04, 42.06, 42.44, 42.21, 29 R; 280/5 R, 150 R, 289 A; 296/23 R, 37 R

[56] References Cited
UNITED STATES PATENTS

| | | | |
|---|---|---|---|
| 2,538,704 | 1/1951 | Pole | 280/5 R X |
| 3,202,332 | 8/1965 | Walker | 224/42.08 X |
| 3,804,308 | 4/1974 | Bodde | 224/42.06 |
| 3,894,668 | 7/1975 | Chapman et al. | 224/42.21 X |

Primary Examiner—L. J. Paperner
Assistant Examiner—Jerold M. Forsberg
Attorney, Agent, or Firm—Wheeler, Morsell, House & Fuller

[57] ABSTRACT

A liquified gas tank is supported on a bracket which is swingably attached to the rear bumper of a camper or trailer below the rear door thereof. The gas tank bracket can be latched in place with the gas tank in front of the rear door so that the gas tank will be supported in a central position when the camper or trailer is in motion. The latch can be released to permit the gas tank to be swung away from the door so that the door can be opened when the camper or trailer is at rest.

2 Claims, 3 Drawing Figures

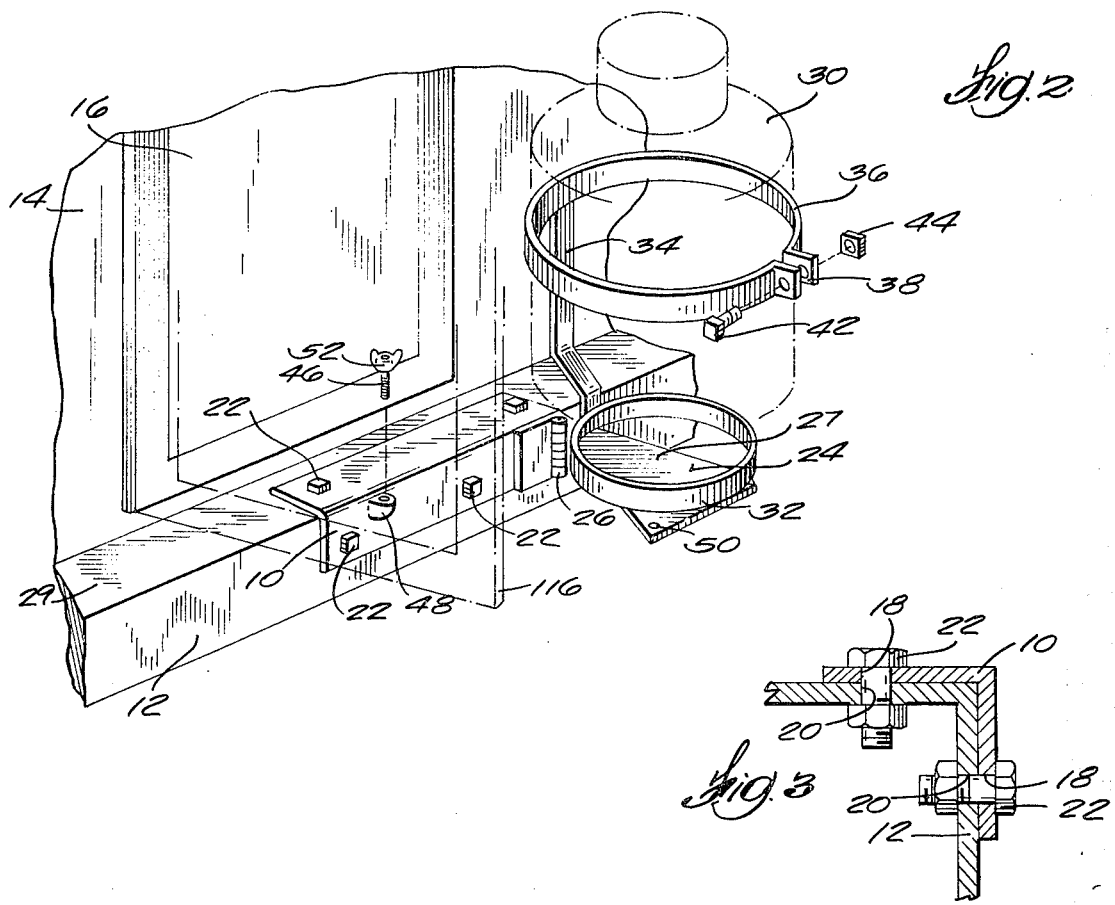
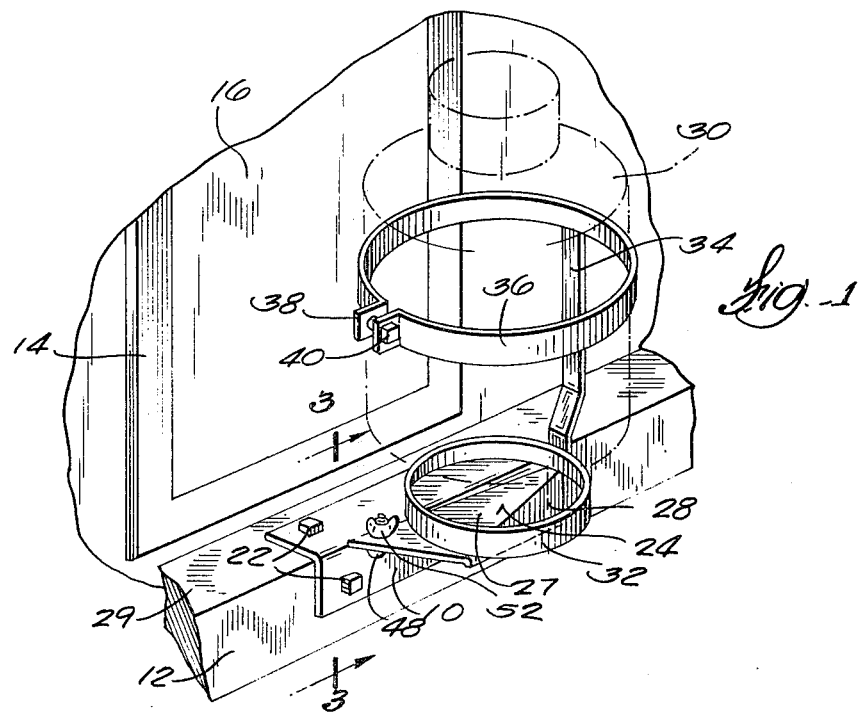

GAS TANK CARRIER FOR CAMPER OR TRAILER

BACKGROUND OF THE INVENTION

This invention relates to liquified gas tank carriers for campers or trailers. In the past, when such gas tank carriers were mounted on the rear of the camper or trailer, they were mounted at one side of the rear door to permit the door to be opened. However, this caused an unbalanced load on the camper or trailer. If the gas tank was mounted directly behind the rear door, it had to be removed for access to the door.

SUMMARY OF THE INVENTION

In accordance with this invention, a swingable gas tank carrier structure is provided upon which a liquified gas tank can be supported in a central position directly behind the rear door of a camper or trailer while the same is in motion and can be unlatched and swung to one side of the door cantilevered from a hinged connection with the vehicle bumper so that the door can be opened when the camper or trailer is at rest. The mounting structure includes two brackets which are swingably connected together at one end and can be releasably latched together at the other end. One of the brackets is adapted to be attached to the rear bumper of the camper or trailer and the other bracket is adapted to support the liquified gas tank.

The swingable bracket includes a top plate which supports the tank and a downwardly-depending flange which extends proximate the center of a tank-supporting ring to provide rigidity to the top plate. The flange tapers downwardly toward the hinge connection with the bumper bracket to form a flange having a width equal to the width of the adjacent bumper bracket flange for the hinged connection between the two brackets.

Further objects, advantages and features of the invention will become apparent from the following disclosure.

DESCRIPTION OF THE DRAWINGS

FIG. 1 is a perspective view of the gas tank carrier of this invention mounted on the rear bumper of a camper or trailer with the gas tank-supporting brackets being latched together to place the gas tank in a central position with respect to the camper or trailer.

FIG. 2 is a perspective view of the gas tank carrier shown in FIG. 1 with the gas tank-supporting brackets thereof being unlatched and swung apart to move the gas tank away from the camper or trailer door to afford access to the door.

FIG. 3 is a fragmentary enlarged cross-sectional view taken on the line 3—3 of FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended thereto.

The gas tank carrier of this invention includes a first bracket 10 which is attached to the rear bumper 12 of a camper or trailer 14 below the rear door 16 thereof. Bracket 10 in this particular embodiment is in the form of an angle iron which has spaced holes 18 (FIG. 3) drilled therein for registry with similarly spaced holes 20 (FIG. 3) in bumper 12 for receiving bolts 22 which clamp bracket 10 to bumper 12. A second bracket 24 is swingably attached to one end of first bracket 10 by means of a hinge 26 (FIG. 2) which is welded to adjacent ends of brackets 10 and 24. Bracket 24 has a triangular top plate 27 and has a triangular or tapered depending flange 28 (FIG. 1) which extends downwardly from the top side. Thus bracket 24 can be stamped from a rectangular sheet of material and the taper is such that the depending flange 28 has a width equal to the width of the bumper bracket to provide a full length hinge connection between the ends of both brackets. By forming the bracket of a single rectangular piece of material, no waste results in forming the bracket. Bracket 24 is made out of steel which is thick enough to support a full tank 30 of liquified gas as shown in broken lines. Hinge 26 is also strong enough to support a full tank of liquified gas 30 in a cantilevered position remote from the bumper.

As a means of holding gas tank 30 in place on bracket 24, a ring 32 which is slightly larger in inside diameter than the lower outside diameter of gas tank 30 is welded to the top of bracket 24. The triangular portion 28 extends beneath the ring proximate the center of the ring to provide support for the bracket 24 and ring 32 near a diameteral line of the ring 32 where the highest loading forces occur. An upright arm 34 which is bent to conform to the profile of gas tank 30 is welded to ring 32 and has a larger split ring 36 welded to the upper end thereof. The inside diameter of split ring 36 is larger than the outside diameter of gas tank 30 when the ends 38 of split ring 36 are separated to receive the tank 30. Holes 40 are drilled in the ends 38 to receive a nut 42 and bolt 44 which draw the ends 38 together so that gas tank 30 will be gripped by split ring 36 to prevent the gas tank 30 from vibrating or bouncing up and down when the camper or trailer 14 is in motion.

The gas tank 30 can be swung back and forth on hinge 26 between a closed position, shown in FIG. 1, in which gas tank 30 is behind door 16, and an open position, shown in FIG. 2, in which gas tank 30 is at the side of door 16 and permits the door 16 to be opened as indicated by the broken lines 116 in FIG. 2. The bracket 24 which supports gas tank 30 can be latched in the closed position by means of a threaded stud 46 (FIG. 2) which is threadably received in a boss or lip 48 on bracket 10. The boss 48 projects from the bracket 10 to provide partial support for bracket 24. A hole 50 is formed in the adjacent corner of bracket 24 to receive the stud 46 which can be provided with a wing nut 52 welded to the stud 46 to facilitate manual manipulation.

When it is desired to use the rear door 16, the stud 46 is removed and the bracket 24 and gas tank 30 are swung to the open position shown in FIG. 2 so that door 16 can be opened. It should be noted that bracket 24 and gas tank 30 can be swung further in the counter-clockwise direction than shown in FIG. 2, although the position shown in FIG. 2 is adequate to allow the rear door 16 to be opened.

The boss 48 (FIG. 2) that projects outwardly from the outer corner of bracket 10 not only supports stud 46 but also helps to support gas tank 30 when bracket 24 is in its closed or central position. Gas tank 30 is also partially supported in the closed position of bracket 24 by the top of bracket 10. The bottom of the tank 30 overlaps the upper surface of the bracket 10 so that adequate support for the tank is provided by the bumper when the vehicle is in motion. More specifically, the top plate 27 of bracket 24 is flush with or in the same plane with the top plate 29 of bracket 10 so that the ring 32 is positioned over and in contact with the top plate 29. The boss 48 is recessed below the surface of top plate 29 to accomplish this result.

What is claimed is:

1. A liquified gas tank carrier comprising a first bracket which is adapted to be attached to the rear bumper of a vehicle below a rear door on the vehicle, a second bracket pivotally connected at one end to one end of said first bracket and swingable about a vertical axis between a central position below said door and a position to one side of said door, means attached to said second bracket for supporting a liquified gas tank thereon, and means for releasably latching said first bracket and second bracket together when said second bracket is in its central position below said door, whereby said liquified gas tank can be supported in a central position in front of said door while said vehicle is in motion and can be swung away from said door when said vehicle is at rest to permit said door to be opened, and said first bracket comprising an angle iron having a top plate and a depending flange and wherein said second bracket has a top plate and a depending flange which tapers toward the connection with said first bracket wherein the means for supporting the tank is attached to said top plate of said second bracket and the means includes a ring for supporting the bottom of a gas tank and wherein said depending flange on said second bracket extends beneath said ring proximate a diameteral line through said ring to rigidly support said ring and the tank.

2. A carrier in accordance with claim 1 wherein said ring is supported in part by said first bracket when said brackets are latched together.

* * * * *